United States Patent

Shimizu et al.

[11] Patent Number: 5,605,552
[45] Date of Patent: Feb. 25, 1997

[54] WET TYPE FLUE GAS DESULFURIZATION APPARATUS

[75] Inventors: Taku Shimizu; Tsuyoshi Ohishi; Koichiro Iwashita; Yoshikazu Endo, all of Tokyo, Japan

[73] Assignee: Mitsubishi Jukogyo Kabushiki Kaisha, Tokyo, Japan

[21] Appl. No.: 442,405

[22] Filed: May 16, 1995

[30] Foreign Application Priority Data

May 17, 1994 [JP] Japan ................................ 6-102494

[51] Int. Cl.$^6$ ............................ B01D 47/00; C01B 17/22
[52] U.S. Cl. ............................ 55/228; 422/213; 422/215; 422/217; 422/231; 423/243.08; 423/243.09; 423/243.11
[58] Field of Search ............................ 422/213, 215, 422/217, 231; 423/243.08, 243.09, 243.11; 55/228; 95/235

[56] References Cited

U.S. PATENT DOCUMENTS

| | | | |
|---|---|---|---|
| 4,487,784 | 12/1984 | Kuroda et al. | 423/555 |
| 4,618,482 | 10/1986 | Shinoda et al. | 423/242 |
| 4,632,810 | 12/1986 | Shinoda et al. | 423/242 |
| 4,696,805 | 9/1987 | Shinoda et al. | 423/242 |
| 5,034,025 | 7/1991 | Ukawa et al. | 55/73 |
| 5,246,678 | 9/1993 | Ochi et al. | 423/243.08 |
| 5,266,286 | 11/1993 | Ukawa et al. | 423/243.08 |

FOREIGN PATENT DOCUMENTS

| | | |
|---|---|---|
| 0369876 | 5/1990 | European Pat. Off. . |
| 0373113 | 6/1990 | European Pat. Off. . |
| 0676230 | 10/1995 | European Pat. Off. . |
| 2163417 | 2/1986 | United Kingdom . |

Primary Examiner—Nina Bhat
Attorney, Agent, or Firm—Jacobson, Price, Holman & Stern, PLLC

[57] ABSTRACT

A wet type flue gas desulfurization apparatus in which desulfurization of flue gas is carried out through gas/liquid phase contact of flue gas with an absorbent slurry. More particularly, disclosed in a combined absorption tower comprising an absorbent slurry liquid tank, a thickening tank serving for concentration by settling of a reaction product slurry formed through the reaction of the absorbent and $SO_2$ present in flue gas, an absorption section situated above said liquid tank for the gas/liquid contact of flue gas and the absorbent slurry as well as for carrying out the desulfurization reaction, and a stack section situated above said absorption section serving for the dispersion of the treated flue gas into the atmosphere, wherein the absorption section is provided with nozzles for upward spraying of the absorbent slurry, and flue gas introduced at the bottom of said absorption section and absorbent slurry sprayed through the nozzles are subjected to gas/liquid contact, and a unreacted portion of the absorbent slurry and a reaction product slurry descend into said liquid tank, and the reaction product slurry from said liquid a tank is introduced into said thickening tank.

4 Claims, 4 Drawing Sheets

WET TYPE FLUE GAS DESULFURIZATION APPARATUS

BACKGROUND OF THE INVENTION

1. Field of the Invention

The present invention relates to an apparatus for wet desulfurization of flue gases. In more details, it relates to an economical wet type flue gas desulfurization apparatus characterized by relatively low equipment and operation costs.

2. Description of Related Art

In order to achieve high sulfur removal efficiency, a conventional wet type flue gas desulfurization apparatus typically has complicated structure similar to the one shown in FIG. 4. Flue gas leaving, for example, a steam generator passes an air preheater and an electrostatic precipitator, and is introduced into the wet type flue gas desulfurization equipment by means of an induced draft fan (IDF). The air preheater heats combustion air, while the electrostatic precipitator removes dust particles of coal ash etc. from the flue gas.

The flue gas leaving the electrostatic precipitator is pressurized by a boost-up fan (BUF), passes a gas-gas heater (GGH) in which the flue gas is cooled down while the flue gas having been treated for desulfurization is heated up, and the flue gas is introduced into an absorption tower or absorber column. The flue gas treated in the absorber and heated up in the gas-gas heater becomes lighter and is discharged into the higher atmosphere through a high stack by the effect of draft.

On the other hand, after preparation in the limestone slurry tank, a lime slurry is introduced into the absorption tower, in which it reacts with sulfur oxides including $SO_2$ present in the flue gas resulting in a gypsum slurry retained at the bottom of the absorption tower. The absorption tower is provided with grid type or other kind of packing layers. The lime slurry flows downward through the packing layers. The flue gas flows co-currently with the absorbent slurry through the bed of packing where the gas and the liquid phases are contacted and the lime component of the slurry reacts with the $SO_2$ content of flue gas.

As a subsequent step, water is removed from the gypsum slurry in a centrifugal separator and gypsum is produced. The waste solution or water removed from gypsum slurry in the centrifugal separator is discharged after treatment in a waste water treatment facility.

As described above, in case of conventional wet type flue gas desulfurization apparatuses, a high sulfur removal of 90 to 95% is achieved taking environmental issues into consideration, and the treated flue gas is dispersed into the higher atmosphere.

However, to achieve a high degree of sulfur removal with conventional technique both construction of the process and structure of the individual units are complex. For this reason, both equipment cost and operation cost are high, and operation requires high technical skills.

Therefore, when a lower capability of desulfurization is acceptable, especially when there is no need to produce a high purity gypsum by-product, the conventional wet type flue gas desulfurization apparatus with superior desulfurization capability may not be economically adequate if equipment and operation costs are taken into consideration. Furthermore, since high operational skills are required, such an apparatus cannot be operated with high efficiency if operators are under-trained and they cannot carry out maintenance jobs well.

In addition, because of the complexity of the system and structure, conventional apparatuses are difficult to add to the flue gas generating apparatus of existing thermal power plants and other facilities.

At present, in industrially developing countries where rapid industrialization is taking place, problems of environmental pollution caused by flue gas, etc. has to be solved urgently. In addition, since population density in such countries is comparatively low, a rapid improvement in the environmental conditions may be achieved even by using desulfurization apparatuses with relatively lower efficiency. Furthermore, there is a strong demand for inexpensive equipment since these countries are not in abundance of financial resources. Moreover, it has become an important issue in these countries to have desulfurization apparatuses that can be installed on existing air-polluting systems such as thermal power plants.

Thus, the conventional wet type flue gas desulfurizing apparatus with high desulfurization efficiency cannot provide a quick as well as both technically and economically satisfactory solution to the flue gas treatment problem in industrially developing countries. There is a strong demand to realize a wet type flue gas desulfurizing apparatus characterized by a relatively low desulfurization efficiency of 70 to 90%, simple construction, and easy operation.

SUMMARY OF THE INVENTION

In view of the problem set forth above, an object of the present invention is to offer a wet type flue gas desulfurization apparatus that is simple in structure and easy to operate as compared to conventional wet type flue gas desulfurization apparatuses.

In order to achieve the above object, the present invention provides a wet type flue gas desulfurization apparatus in which the desulfurization of flue gas is carried out through gas/liquid contact of the flue gas and an absorbent slurry; said apparatus comprising a combined absorption tower which includes within a single body a liquid tank accommodating the absorbent slurry, a thickening tank in which a product of reaction between the absorbent and $SO_2$ present in the flue gas becomes concentrated through settling, an absorption section which is situated over said liquid tank and in which desulfurization reaction takes place through gas/liquid phase contact of the flue gas and the absorbent slurry, nozzles provided near a lower end of said absorption section for injection of the absorbent slurry in an upward direction, and a stack section situated over said absorption section serving for dispersing the treated flue gas into atmosphere; wherein said flue gas introduced at a lower end of said absorption section and the absorbent slurry injected through said nozzles are contacted, and the reaction product slurry descending with an unreacted portion of the absorbent slurry are collected in said liquid tank, and the reaction product slurry is introduced from said liquid tank into said thickening tank.

According to the present invention, limestone ($CaCO_3$), slaked lime ($Ca(OH)_2$) and quicklime (CaO), which are conventionally used in the wet type lime-gypsum method, can be used as absorbent.

Since the retention time of the gypsum slurry in the thickening tank changes with the thickening ratio of the reaction product slurry, it should be through experiments, ect., using the real reaction product slurry. Moreover, the projection height of the absorbent slurry through the spray nozzles, the superficial velocity of the flue gas and other design factors of the combined absorption tower should be determined experimentally.

In a preferable implementation of the present invention the thickening tank is formed by separating a part of the liquid tank installed at the bottom part of the combined absorption tower by a partition, and an opening in the partition lets the gypsum slurry flow from the liquid tank into the thickening tank.

In this way, the structure becomes simple because the liquid tank and the thickening tank can be accommodated in one body.

In a further preferable implementation of the present invention, an absorbent silo and a distributor for feeding and distributing a powdered absorbent from the absorbent silo are installed at the top the absorption section. The powdered absorbent, supplied to the absorbent silo by pneumatic transport, is dispersed into the absorption section by the sprinkler, and it descends, comes into contact with the absorbent slurry inside the absorption section, and becomes suspended in the slurry.

There is no need to use an absorbent slurry adjustment tank required in case of conventional desulfurization apparatuses, and the construction of the equipment is further simplified.

Another preferable implementation of the present invention is characterized by the installation of a mist catcher in the stack. The stack is installed above the liquid tank and the absorption section. Mist entrapped in the mist catcher falls down directly and is trapped by the absorbent slurry. Thus, the amount of mist discharged through the stack can be reduced. The mist catcher can be of any type but taking into account the requirements of simple structure and low flue gas pressure drop, a swirl-flow mist catcher is preferable.

According to the present invention, the combined absorption tower is upright and has a single body. The bottom part of the absorption tower comprises a liquid tank containing the absorbent slurry, and a thickening tank in which the reaction product slurry formed in the reaction between the absorbent and the $SO_2$ component of flue gas is thickened through settling. The intermediate section above this liquid tank (or the liquid tank and the thickening tank) constitutes the absorption section wherein the flue gas and the absorbent slurry are contacted. Furthermore, a stack is installed above the absorption section for the dispersion of the treated flue gas into the atmosphere.

Therefore, in contrast to conventional apparatuses wherein the absorption tower and the stack are connected by a duct, the treated flue gas leaving the absorption section directly enters the stack.

The absorbent slurry projected upward through the nozzles first moves upward then downward in the absorption section. The flue gas introduced into the absorption section from the bottom section comes into contact with the rising absorbent slurry in an upward concurrent flow and with the descending absorbent slurry in a counter-current flow, while $SO_2$ present in the flue gas reacts with the absorbent to form a reaction product.

To provide further details, the absorbent slurry projected through the nozzle flows upward, and becomes dispersed in the uppermost portion of the rising flow, then descends (refer to FIG. 3).

The descending absorbent slurry and upward injected absorbent slurry collide each other and are dispersed into fine drops. Therefore, the gas/liquid phase contact per unit volume is larger than in conventional packed towers. Further, as the dispersed slurry exists in granular form, and because the flue gas in the vicinity of the nozzle gets effectively enfolded by the upward directed jets of absorbent slurry, the mixing of absorbent slurry and flue gas is efficient so that the contact of the two phases is intensified. Because of the two effects mentioned above, the volume of the absorption section according to the present invention can be relatively small.

In contrast to conventional packed bed absorbers, the absorption section according to the present invention does not require washing or changing of packing materials. Furthermore, maintenance is not necessary since there are no moving parts in the apparatus. Therefore, the operation of the apparatus does not require skilled personnel. Moreover, since the pressure drop of the flue gas in the absorption section is low as compared to conventional packed towers, the boost-up fan used in conventional wet type flue gas desulfurization apparatuses becomes unnecessary.

The reaction product is settled out from the product slurry through natural settling so that it becomes unnecessary to use a product water removal apparatus installed in conventional desulfurizing apparatuses. For instance, the product slurry is thickened to an extent that when it is kneaded with coal ash from a coal fired thermal power plant, a mass of paste-like material is obtained that can be transported by usual transportation means for solids.

Based on the above described construction, the wet type flue gas desulfurization apparatus according to the present invention has the following advantages in terms of simple construction and easy operation as compared to conventional wet type flue gas desulfurization apparatuses.

(1) Since the treated flue gas leaving the absorption section is directly introduced into the stack, the costly gas-gas heater becomes unnecessary, and the length of gas ducts that increases the construction costs can be radically reduced.

(2) Since an absorbent slurry spray type absorber with low pressure drop is applied instead of a packed bed absorber showing high pressure drop the outlet pressure provided by a single induced draft fan is sufficient for the operation, and it is not necessary to use a boost-up fan. Equipment and operation costs can be curtailed because of this difference.

(3) There is no need to install water removal equipment because the gypsum slurry is thickened to approximately 60 weight percent in the thickening tank, and kneading it with coal ash provides a waste material of low fluidity. In addition, the waste disposed cost will not be that high because the product slurry can be disposed of together with coal ash.

(4) In contrast to conventional equipment wherein a waste water treatment facility is required in order to treat the waste water generated in a water removal apparatus, such facility is unnecessary according to the present invention, and equipment and operation costs can be reduced. Moreover, there is no need to employ skilled operators, because the operationally troublesome waste water treatment facility is unnecessary.

Based on the aforementioned, since the wet type flue gas desulfurization apparatus according to the present invention is characterized by relatively low equipment costs and easy operation, it meets the demands of industrially developing or other countries.

DETAILED DESCRIPTION OF THE PREFERRED EMBODIMENT

With reference to the attached drawings, in the following section the present invention will be explained in more details based on the implementation example.

Figure 1:
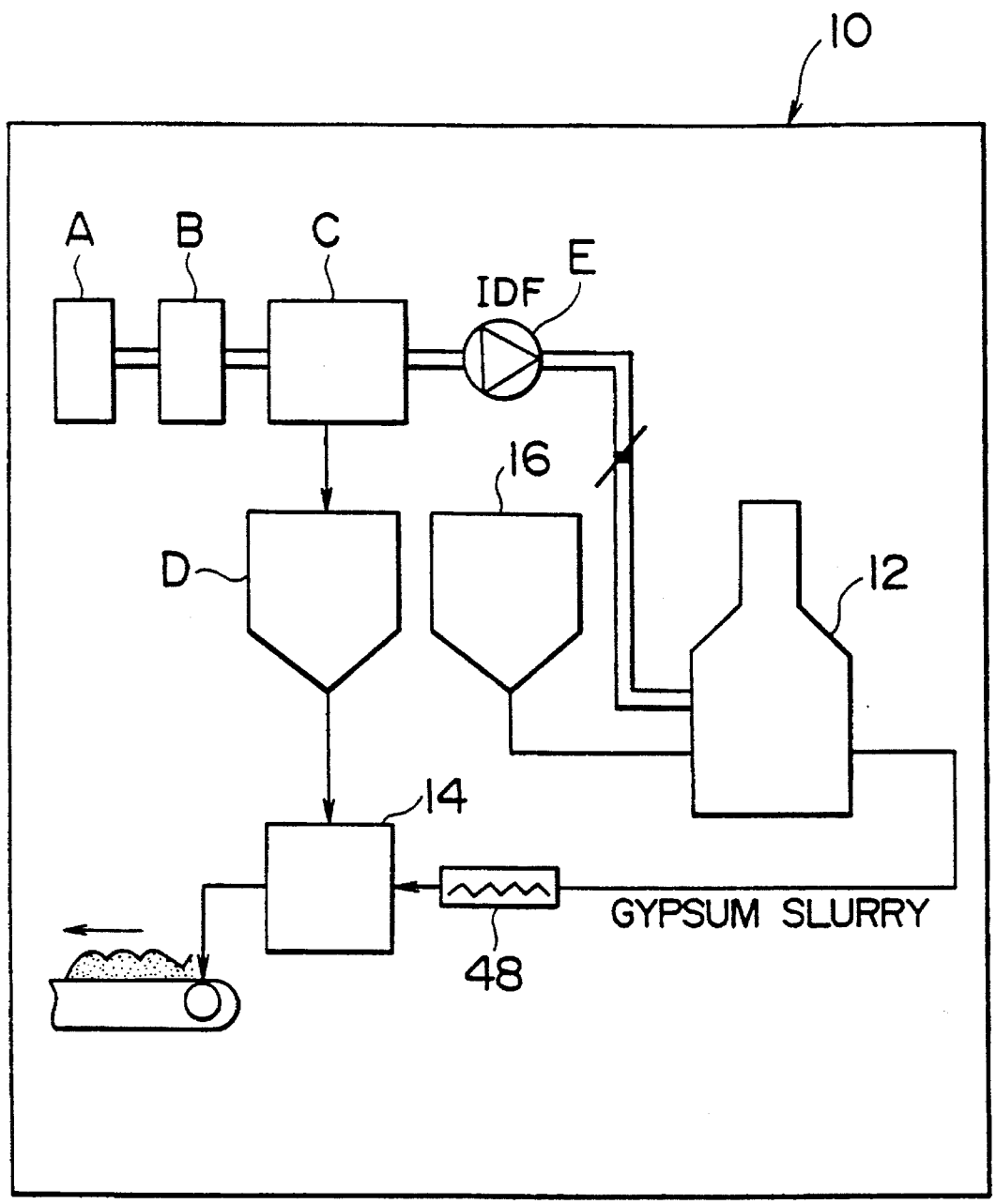
FIG. 1 shows a schematic flow diagram of an embodiment of the wet type flue gas desulfurization apparatus according to the present invention.
Figure 2:
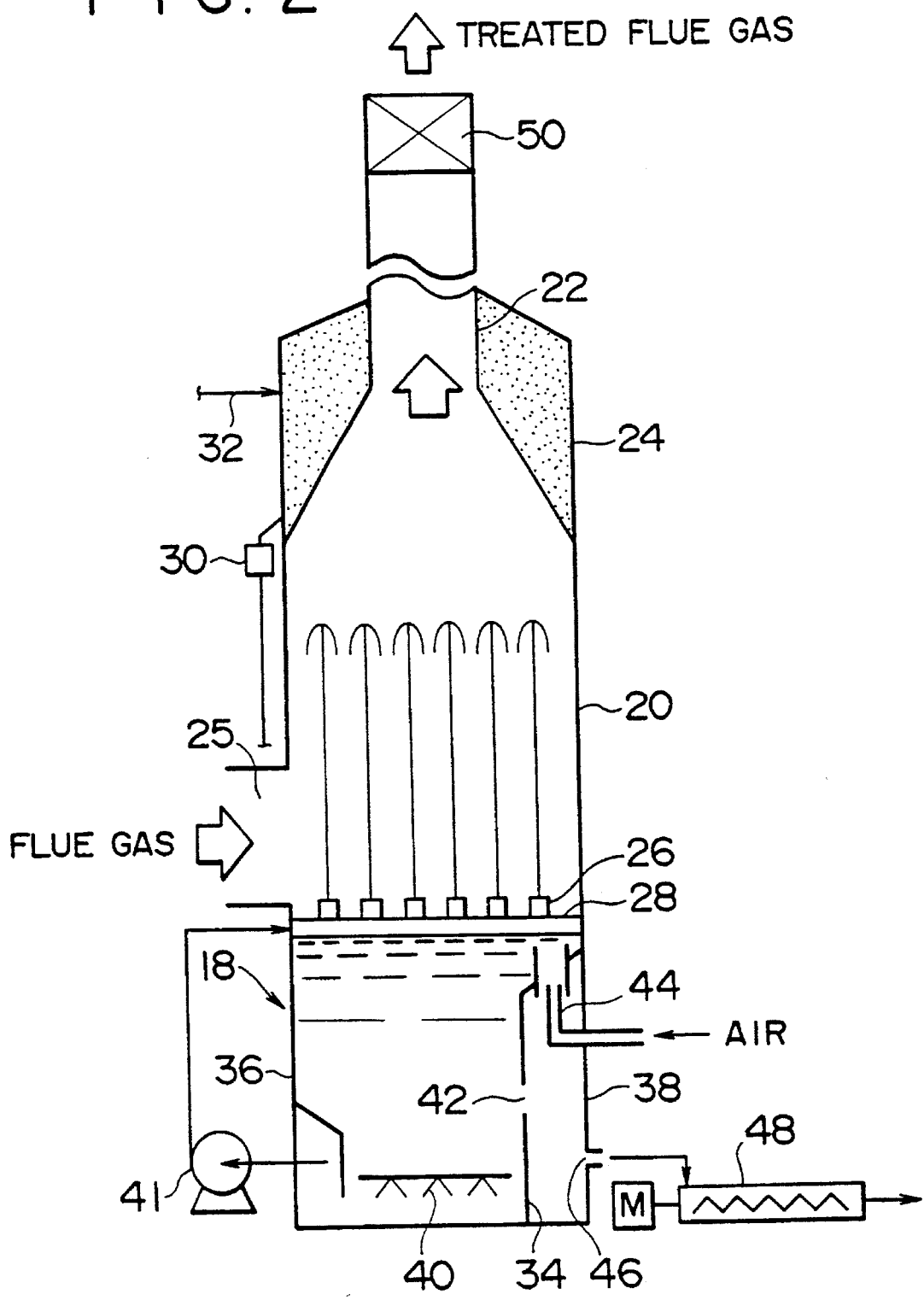
FIG. 2 is a cross sectional view of the combined absorption tower of the wet type flue gas desulfurization apparatus shown in FIG. 1.
Figure 3:
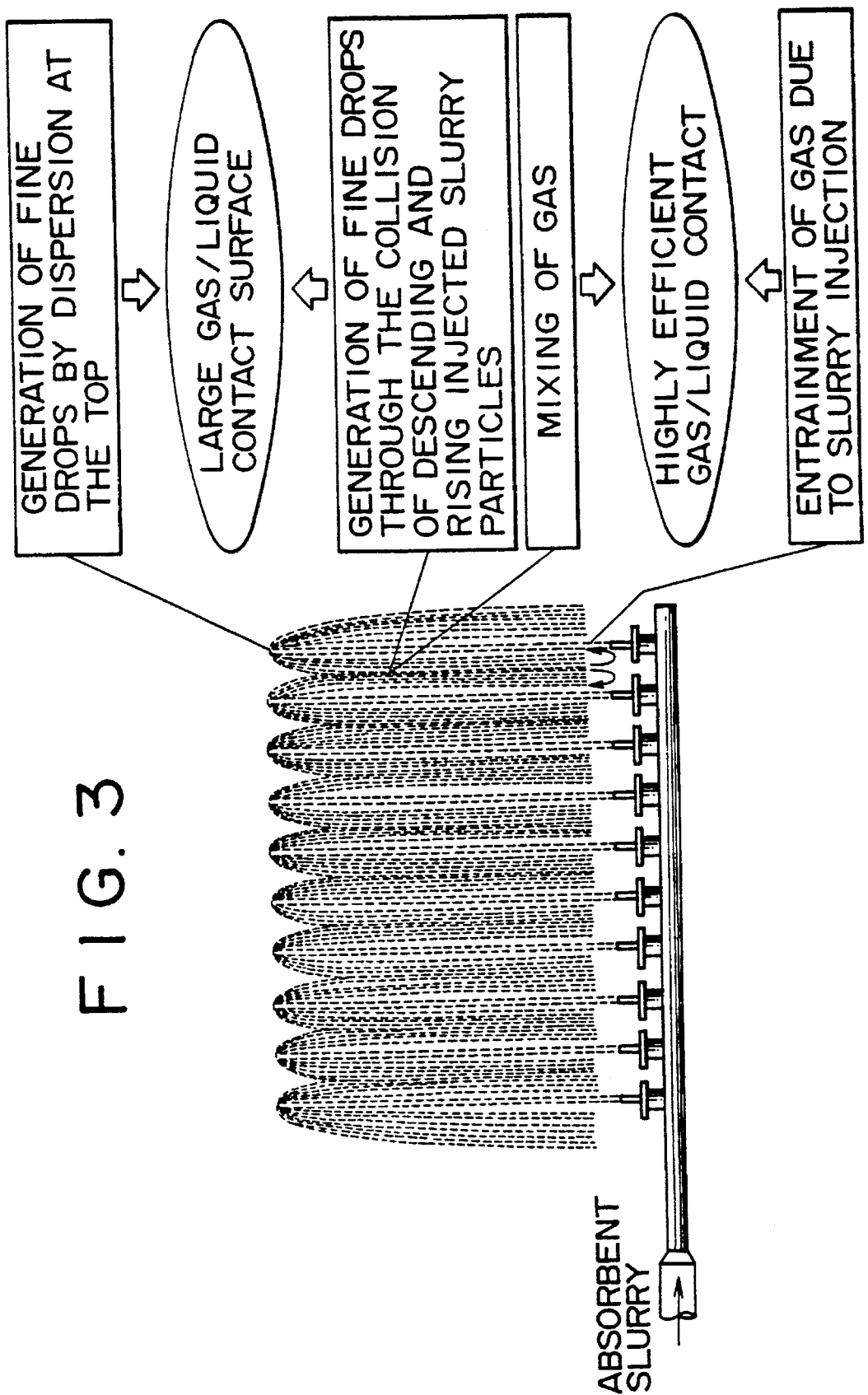
FIG. 3 is a schematic drawing to show the state of absorbent slurry projected through the nozzles.

FIG. 1 shows the wet type flue gas desulfurization apparatus according to the present invention, while FIG. 2 shows the construction of the combined absorption tower of the wet type flue gas desulfurization apparatus shown in FIG. 1.

Figure 4:
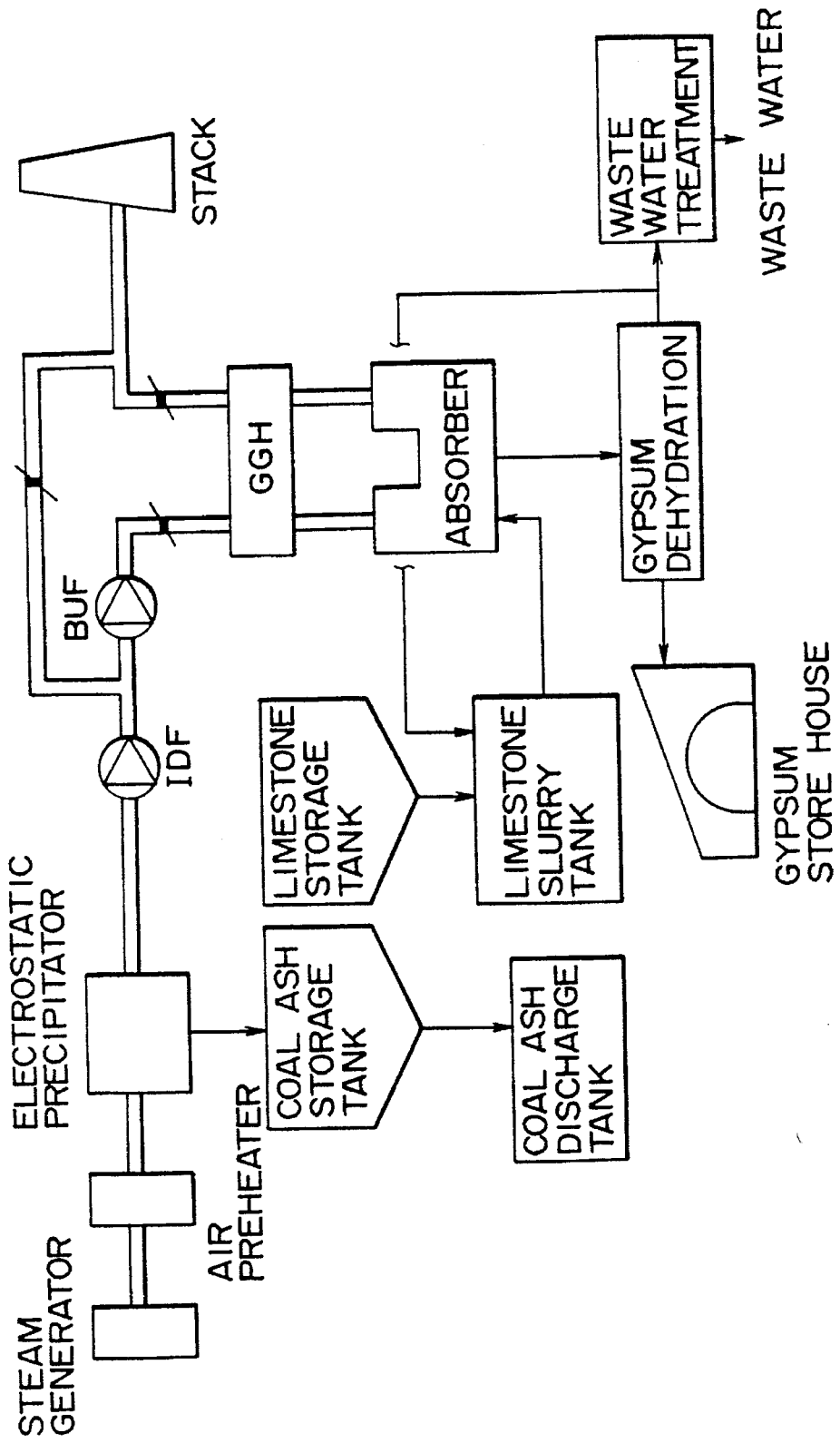
FIG. 4 is a flow diagram of conventional wet type flue gas desulfurization apparatus.

The wet type flue gas desulfurization apparatus 10 according to the embodiment in FIG. 1 uses limestone as absorbent, and utilizes the lime-gypsum method for the removal of $SO_2$ gas from flue gas. In place of a group of devices consisting of a boost-up fan (BUF), a gas-gas heater (GGH), an absorption tower, a limestone slurry adjustment tank, a gypsum dehydrating device, and a waste water treatment device for the treatment of waste liquor from gypsum dehydration which constitute a conventional wet type flue gas desulfurization apparatus shown in FIG. 4, the apparatus 10 of the present invention comprises an absorption tower 12 combined with a stack (hereafter briefly referred to as a stack/absorber), and a kneading machine 14 for kneading the concentrated gypsum slurry with coal ash, as well as, similar to conventional apparatuses, a limestone container tank 16.

Flue gas leaving the coal-fired steam generator A of the thermal power plant is sucked by the induced draft fan (IDFE), passes the air preheater B and the electrostatic precipitator C, and enters the stack/absorber 12 of the present embodiment.

The flue gas leaving the steam generator A preheats the combustion air in the preheater B, becomes cooled down, and enters the electrostatic precipitator C. Coal ash and other particles are separated and removed from the flue gas in electrostatic precipitator C, and are collected in the coal ash storage tank D.

The, flue gas is sucked by the induced draft fan E and enters the absorption section of stack/absorption tower 12.

As it is shown in FIG. 2, the stack/absorption tower 12 comprises a liquid storage tank 18 at the bottom part, an absorption section 20 above the tank, and a stack 22 above the absorption section, combined into an upright, columnar single body. Outside of this structure, at a suitable position between the absorption section 20 and the stack 22, an annular-shaped absorbent silo 24 is installed.

The flue gas enters the absorption section 20 through a flue gas inlet 25 provided at the bottom part of the absorption section 20 and rises inside the absorption section 20. At the bottom part of the absorption section 20, several lime slurry projection nozzles 26 are arranged in a single-stage nozzle header 28 with an approximately equidistant distribution in a horizontal plane for spraying of the lime slurry into the absorption section. Nozzles 26 are installed to face upward, so that the lime slurry is sprayed in upward directions.

The absorbent silo 24 is situated at the top of the absorbent section 20, and the required amount of the absorbent is taken from the absorbent silo 24 by means of the feeder 30. Subsequently, the absorbent passes a pipeline, and is supplied to the storage tank 18 at the bottom. The limestone powder is transported from the limestone storage tank 16 (see FIG. 1) to the absorbent silo 24 by means of a known pneumatic transport device. Moreover, instead of or in addition to supplying the absorbent to the storage tank 18 at the bottom through the feeder 30, an absorbent distributor (not shown) is installed at the top of the absorbent section 20, and the dispersive dropping of the powdered absorbent becomes possible. The dispersed absorbent descends and comes into contact with the sprayed absorbent slurry, and becomes arrested in the slurry. In this way, a separate absorbent slurry adjustment tank becomes unnecessary.

The storage tank 18 is a single tank separated by a partition 34 into a gypsum slurry tank 36 and a gypsum slurry thickening tank 38 (briefly referred to as thickening tank hereafter). In a gypsum slurry tank 36 air nozzles 40 are installed and air is sprayed in order to provide agitation to prevent settling of gypsum particles out of the retained gypsum slurry and also to oxidize the absorbed sulfite to sulfate.

The slurry pump 41 is installed in the pipeline connecting the gypsum slurry tank 36 and the nozzle header 28, so as to supply gypsum slurry from gypsum slurry tank 36 to nozzle header 28.

At a suitable position on the partition 34, there is an opening 42 facilitating the flow of the gypsum slurry from the gypsum slurry tank 36 into the thickening tank 38. The thickening tank 38 has a volume sufficient to provide the required retention time of the gypsum slurry to achieve appropriate thickening through natural (gravitational) settling.

The thickening tank 38 is provided with an outlet 46 at the bottom through which the thickened gypsum slurry is discharged to a transportation device 48, e.g., a belt conveyor (also refer to FIG. 1).

Moreover, in order to adjust the degree of thickening, an air inlet pipe 44 supplying air extends into the gypsum slurry tank 36.

As shown in FIG. 1, a kneading machine 14 is installed at an end of transportation device 48 wherein the concentrated gypsum slurry is kneaded with coal ash falling down from coal ash storage tank D and the resulting material can be handled by a conventional belt conveyor because it has lost its fluidity.

In order to retain mist contained in the treated flue gas, a mist catcher 50 is installed at the top of stack 22. The mist catcher 50 is a conventional swirl-flow mist catcher. The retained mist descends as liquid drops from the mist catcher 50 due to gravitation, and the drops are caught by the lime slurry sprayed into absorption section 20.

In this embodiment of the desulfurization apparatus 10, some 70 to 90% of the $SO_2$ content of flue gas can be removed.

The absorbent slurry sprayed in an upward direction through the nozzles 26 first rises to a certain height then descends in the opposite direction. In this process, the liquid drops collide each other to form fine particles. Subsequently, this gypsum slurry descends to the gypsum slurry tank 36 situated at the bottom of the absorption section 20. The $SO_2$ gas in the flue gas reacts with the lime component of the gypsum slurry forming calcium sulfite. In a further reaction with the introduced air it is oxidized to calcium sulfate, i.e., gypsum, and forms the gypsum slurry.

The slurry containing unreacted lime and gypsum descends into the gypsum slurry tank 36 and flows into the thickening tank 38 through the opening 42 to become concentrated.

We claim:

1. A wet type flue gas desulfurization apparatus in which desulfurization of flue gas is carried out through gas/liquid contact of the flue gas and an absorbent slurry;

said apparatus comprising a combined absorption tower which includes within a single body a liquid tank accommodating the absorbent slurry, a thickening tank in which a product of reaction between the absorbent and $SO_2$ present in the flue gas becomes concentrated through settling, an absorption section which situated over said liquid tank and in which desulfurization reaction takes place through gas/liquid phase contact of the flue gas and the absorbent slurry, nozzles provided near a lower end of said absorption section positioned directly above a liquid surface for spraying of the absorbent slurry in an upward direction, and a stack section situated over said absorption section serving for dispersing the treated flue gas into atmosphere;

wherein said flue gas introduced at a lower end of said absorption section and the absorbent slurry sprayed through said nozzles are contacted, and an unreacted portion of the absorbent slurry and a reaction product slurry descend, and are collected in, said liquid tank, the reaction product slurry is introduced from said liquid tank into said thickening tank and a concentrated sludge is discharged from the thickening tank.

2. The wet type flue gas desulfurization apparatus according to claim 1, wherein said thickening tank is formed by separating a part of the liquid tank installed at the bottom of said combined absorption tower by a partition having thereon an opening for allowing a flow of the reaction product slurry from the liquid tank into the thickening tank.

3. The wet type flue gas desulfurization apparatus according to claim 1, wherein an absorbent silo and a distributor for dispersing and letting a powdered absorbent fall into said absorption section are installed at a top of said absorbent section, and the absorbent powder supplied to the absorbent silo by pneumatic transport is dispersed in the absorbent section through the distributor so that it descends, comes into contact with and becomes caught by the slurry in said absorption section.

4. The wet type flue gas desulfurization apparatus according to claim 1 wherein said stack section is provided with a mist catcher.

* * * * *